R. G. MITCHELL.
BRUSH CUTTER.
APPLICATION FILED JAN. 18, 1911.
1,001,211.
Patented Aug. 22, 1911.
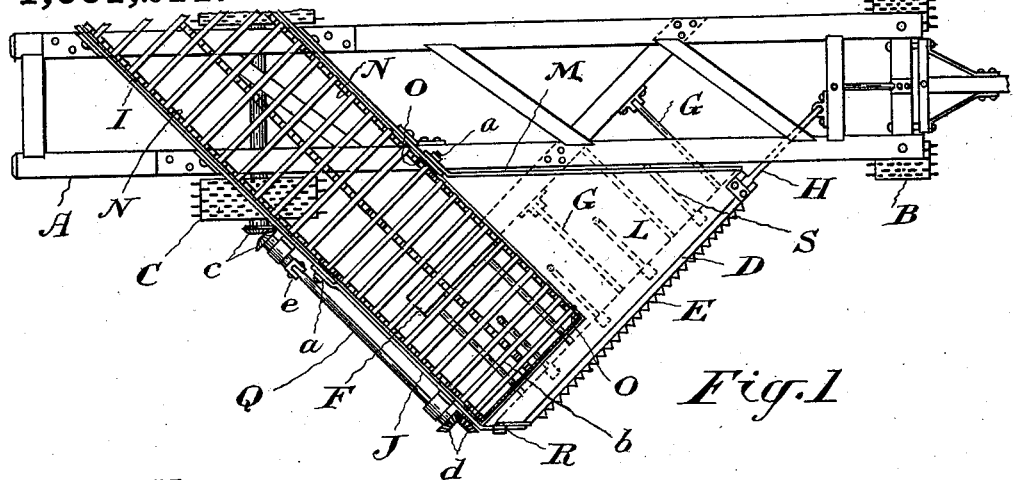
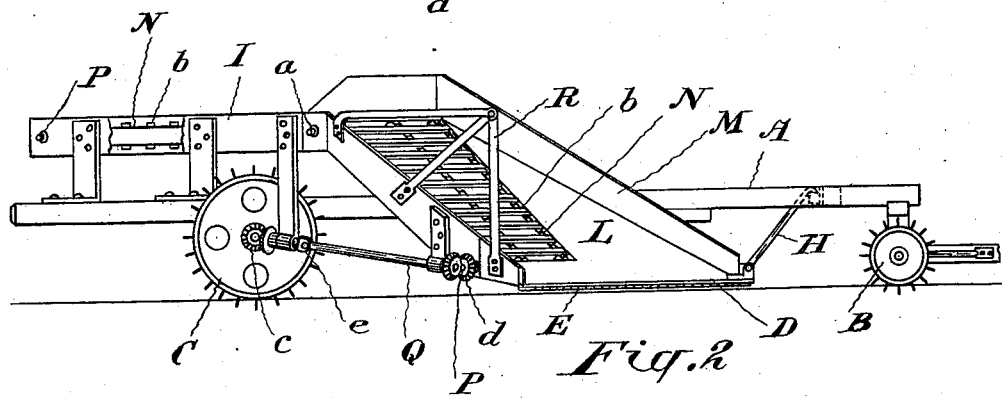
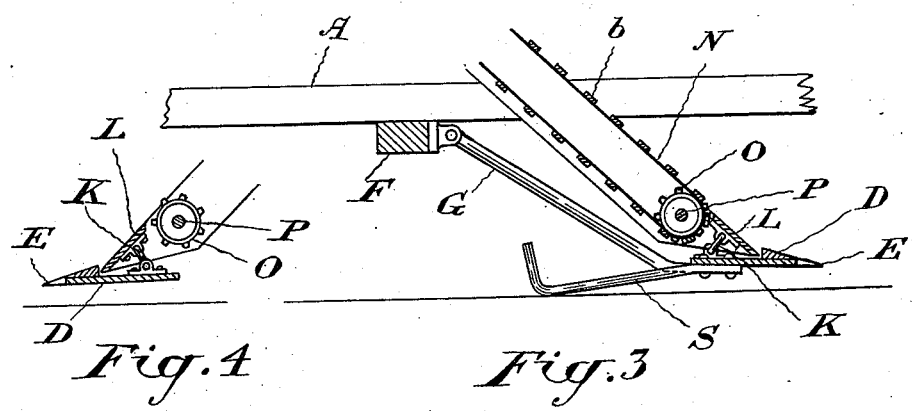
WITNESSES:
INVENTOR.

UNITED STATES PATENT OFFICE.

ROBERT G. MITCHELL, OF TOFIELD, ALBERTA, CANADA.

BRUSH-CUTTER.

1,001,211.　　　　Specification of Letters Patent.　　Patented Aug. 22, 1911.

Application filed January 18, 1911. Serial No. 603,286.

*To all whom it may concern:*

Be it known that I, ROBERT G. MITCHELL, of Tofield, in the Province of Alberta, Canada, have invented certain new and useful Improvements in Brush-Cutters, of which the following is a specification.

This invention relates to devices employed to cut down the underbrush when clearing land for agricultural purposes.

The brush cutters ordinarily employed are drawn over the ground to be cleared by traction engines and leave the cut brush behind them, but they are difficult to control in steering, do not cut all the brush at the same height above the ground and leave the cut brush so that too much manual labor is required to handle it. I aim to overcome these troubles and accomplish the desired result by the construction hereinafter described and illustrated in the accompanying drawings in which—

Figure 1 is a plan view of a brush cutter constructed in accordance with my invention. Fig. 2 is a side elevation of the same. Fig. 3 is a vertical section through the cutter bar and its supporting frame. Fig. 4 is a sectional detail showing the method of supporting the forward end of the elevator frame on the cutter bar.

In the drawings like letters of reference indicate corresponding parts in the different figures.

A is a longitudinal main frame on which are journaled the front wheels B and the rear wheels C. These wheels are preferably spiked as shown to give them a sufficient grip on the ground to resist the side thrust which is necessarily very considerable when the apparatus is in use.

D is a floating cutter bar which may be of any suitable construction, preferably provided with a serrated cutter blade E. This cutter bar is connected with the frame to allow it to rise and fall, preferably in the following manner: A diagonal frame piece F is suitably connected with and extends out from the main frame. With this diagonal frame piece the cutter bar is connected by braces G preferably rigidly secured to the cutter bar and pivotally connected with the frame piece. The cutter bar is held from movement in the direction of its length by means of the brace H pivotally connected with the end of the cutter bar and the main frame.

An elevator and carrier is provided to carry the cut brush rearwardly across the main frame. This elevator and carrier is preferably supported so that its front end will rise and fall with the cutter bar. A preferable arrangement is as follows: A stationary elevator frame I is secured to the main frame, and to the forward end of this a movable elevator frame J is pivoted at *a*. As the forward end of this frame J is supported from the cutter bar and as the latter rocks from a point not coincident with the point from which the frame rocks there is necessarily some backward and forward movement between the forward end of the frame J and the cutter bar. Any suitable device may be provided to take care of this motion. I use for this purpose, however, links K pivotally connected with the forward end of the frame J and with the cutter bar. These links give the elevator frame the necessary support and at the same time permit of the movements described. Formed with the elevator frame there is the brush deck L which fills in the triangular space between the forward end of the elevator and the main frame and serves to guide the brush on to the elevator. A butter board M is preferably provided at the inner side of the brush deck to guide the brush on to the elevator.

The elevator is formed of a series of slats *b* secured to sprocket chains N which run on the sprocket wheels O secured to the spindles P journaled in the elevator frames I and J. The elevator chains may be driven in any suitable manner. I show them as driven through the medium of a shaft Q from the rear wheels of the machine. This shaft is driven by the bevel gearing *c* from the inner rear wheel and conveys its motion to the forward spindle P of the elevator through the medium of the bevel gearing *d*. Owing to the front end of the elevator partaking of the floating movement of the cutter bar it is necessary to provide a universal joint *e* in this shaft Q and if necessary the shaft may be made telescopic. Ground shoes S are preferably connected to the cutter bar to guide it over the ground at a constant level and owing to the floating support of the cutter bar it is in no way affected in this respect by any movements of the frame.

When working this brush cutter operates along the same general lines as a grain harvester, the cut brush being deposited to one side so that a clear space is left in which the traction engine may run when making the next cut, which is an advantage not hitherto attained as far as I am aware in brush cutters such as ordinarily employed without the use of manual labor in clearing the truck. In practice, of course, many of the details of construction may be changed without departing from the spirit of my invention.

I find it preferable to provide a substantially vertical divider knife R at the outer end of the cutter bar. This knife is preferably connected to and braced from the elevator frame as shown.

What I claim as my invention is:—

1. In a brush cutter the combination of a longitudinal main frame provided with front and rear wheels; a cutter bar inclined to the line of travel and extending from one side of the main frame; a brush deck behind the cutter bar; and a brush elevator receiving brush from the brush deck and discharging it across the rear of the main frame.

2. In a brush cutter the combination of a longitudinal main frame provided with front and rear wheels; and a floating cutter bar inclined to the line of travel and extending from one side of the main frame.

3. In a brush cutter the combination of a longitudinal main frame provided with front and rear wheels; a floating cutter bar inclined to the line of travel and extending from one side of the main frame; a brush deck behind the cutter bar; and a brush elevator receiving brush from the brush deck and discharging it across the rear of the main frame.

4. In a brush cutter the combination of a longitudinal main frame provided with front and rear wheels; a floating cutter bar inclined to the line of travel and extending from one side of the main frame; a brush deck behind the cutter bar; and a brush elevator receiving brush from the brush deck and discharging it across the rear of the main frame; the said elevator having its front end supported by and vertically movable with said floating cutter bar.

5. In a brush cutter the combination of a longitudinal main frame; a diagonal frame piece extending from one side of said frame; and a floating diagonal cutter bar in front of said frame piece and braced therefrom.

6. In a brush cutter the combination of a longitudinal main frame; a diagonal frame piece extending from one side of said frame; a floating diagonal cutter bar in front of said frame piece; pivoted braces connecting the cutter bar and frame pieces; and a pivoted brace connecting the inner end of the cutter bar with the main frame.

7. In a brush cutter the combination of a longitudinal main frame; a diagonal frame piece extending from one side of said frame; a floating diagonal cutter bar in front of said frame piece and braced therefrom; and rearwardly extending ground shoes connected to the cutter bar.

8. In a brush cutter the combination of a longitudinal main frame provided with front and rear wheels; a cutter bar inclined to the line of travel and extending from one side of the main frame; a brush deck behind the cutter bar; a brush elevator receiving brush from the brush deck and discharging it across the rear of the main frame; and a vertical divider knife supported at the outer end of the cutter bar.

Dated at Reinbeck, Iowa, this 27th day of December, 1910.

ROBERT G. MITCHELL.

Signed in the presence of—
HENRY MOHR,
JOHN MURRAY.

Copies of this patent may be obtained for five cents each, by addressing the "Commissioner of Patents, Washington, D. C."